(12) United States Patent
Fukui et al.

(10) Patent No.: US 10,814,828 B2
(45) Date of Patent: Oct. 27, 2020

(54) GAS GENERATOR

(71) Applicant: DAICEL CORPORATION, Osaka-shi, Osaka (JP)

(72) Inventors: Yuki Fukui, Tatsuno (JP); Tomoharu Kobayashi, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 72 days.

(21) Appl. No.: 16/321,950

(22) PCT Filed: Aug. 14, 2017

(86) PCT No.: PCT/JP2017/029272
§ 371 (c)(1),
(2) Date: Jan. 30, 2019

(87) PCT Pub. No.: WO2018/043105
PCT Pub. Date: Mar. 8, 2018

(65) Prior Publication Data
US 2019/0176745 A1    Jun. 13, 2019

(30) Foreign Application Priority Data

Aug. 29, 2016 (JP) ................................. 2016-166668

(51) Int. Cl.
*B60R 21/264* (2006.01)
*B01J 7/00* (2006.01)
*B60R 21/26* (2011.01)

(52) U.S. Cl.
CPC .............. *B60R 21/264* (2013.01); *B01J 7/00* (2013.01); *B60R 2021/26029* (2013.01); *B60R 2021/2648* (2013.01)

(58) Field of Classification Search
CPC ......... B60R 21/264; B60R 2021/26011; B60R 2021/26029; B60R 2021/2642; B60R 2021/2648; B01J 7/00
See application file for complete search history.

(56) References Cited

U.S. PATENT DOCUMENTS 6,485,051 B1    11/2002 Taguchi et al.
6,709,012 B1 *  3/2004 Tanaka .................. B60R 21/017
                                            280/736

(Continued)

FOREIGN PATENT DOCUMENTS

| JP | 2000-296756 A | 10/2000 | |
| JP | 2016-34768 A | 3/2016 | |
| JP | 2019098956 A * | 6/2019 | ........... B60R 21/264 |

OTHER PUBLICATIONS

International Search Report (PCT/ISA/210) issued in PCT/JP2017/029272, dated Oct. 24, 2017.

(Continued)

*Primary Examiner* — Laura Freedman
(74) *Attorney, Agent, or Firm* — Birch, Stewart, Kolasch & Birch, LLP (57) ABSTRACT

Provided is a gas generator including in a housing having a top plate, a bottom plate and a circumferential wall provided with a gas discharge port; a first combustion chamber arranged on the side of the top plate; a second combustion chamber arranged on the side of the bottom plate; a plenum chamber facing the gas discharge port and arranged between the first combustion chamber and the second combustion chamber; a first igniter for igniting and burning a first gas generating agent in the first combustion chamber; and a second igniter for igniting and burning a second gas generating agent in the second combustion chamber.

16 Claims, 5 Drawing Sheets

(56) References Cited

U.S. PATENT DOCUMENTS

| | | | |
|---|---|---|---|
| 6,793,244 B1* | 9/2004 | Katsuda | B60R 21/272 |
| | | | 280/741 |
| 6,929,284 B1 | 8/2005 | Saso et al. | |
| 7,175,197 B2* | 2/2007 | Iwai | B60R 21/2644 |
| | | | 280/736 |
| 7,527,289 B2* | 5/2009 | Numoto | B60R 21/2644 |
| | | | 280/736 |
| 7,665,764 B2* | 2/2010 | Matsuda | B60R 21/2644 |
| | | | 280/736 |
| 8,236,112 B2* | 8/2012 | Yamazaki | B60R 21/2644 |
| | | | 149/2 |
| 8,656,838 B1 | 2/2014 | Mayville | |
| 8,740,245 B2* | 6/2014 | Fukawatase | B60R 21/2644 |
| | | | 280/736 |
| 2017/0166160 A1 | 6/2017 | Izuma | |
| 2019/0241149 A1* | 8/2019 | Kobayashi | B60R 21/268 |

OTHER PUBLICATIONS

Written Opinion of the International Searching Authority (PCT/ISA/237) issued in PCT/JP2017/029272, dated Oct. 24, 2017.
International Preliminary Report on Patentability and Written Opinion of the International Searching Authority, dated Mar. 5, 2019, for International Application No. PCT/JP2017/029272.

* cited by examiner

GAS GENERATOR

TECHNICAL FIELD

The present invention relates to a gas generator that is usable in an airbag apparatus for an automobile.

DESCRIPTION OF RELATED ART

In a gas generator used in an airbag apparatus, necessary parts or the like are accommodated in a housing. A cylindrical shape and a disk shape are known as shapes of the housing, and there is known a gas generator in which two combustion chambers are vertically separated.

FIG. 1 of U.S. Pat. No. 6,485,051 B discloses a dual-type gas generator in which a housing 1 is partitioned into an upper combustion chamber 3 and a lower combustion chamber 4 by a partition member 5, gas generating agents 6 are charged into the respective combustion chambers, and the gas generating agents 6 are individually ignited by igniters 8 and 9. The igniters 8 and 9 are fixed to a lower lid 17, and further, the igniter 8 is mounted to a cylindrical casing 18 extending from the lower lid 17.

SUMMARY OF INVENTION

A first aspect of the present invention (hereinafter referred to as a "first aspect") provides a gas generator, including:

a housing having a top plate, a bottom plate and a circumferential wall provided with a gas discharge port;

a first combustion chamber formed between a first annular retainer disposed in the housing and the top plate;

a second combustion chamber formed between a second annular retainer disposed in the housing and the bottom plate;

a plenum chamber disposed between the first combustion chamber and the second combustion chamber and communicating with the gas discharge port;

a first igniter fixed to the bottom plate to ignite and burn a first gas generating agent in the first combustion chamber, and a second igniter disposed facing the second combustion chamber to ignite and burn a second gas generating agent in the second combustion chamber;

an inner cylinder provided with a flame-transferring hole at a position facing the first combustion chamber and disposed in the housing such that a first end opening thereof surrounds the first igniter and a second end opening thereof is positioned on the side of the top plate;

the first annular retainer having a first annular bottom surface provided with a first communication hole, a first inner circumferential edge portion of the first annular bottom surface abutting against a circumferential wall of the inner cylinder, and the first communication hole allowing communication between the first combustion chamber and the plenum chamber; and the second annular retainer having a second annular bottom surface provided with a second communication hole, a second inner circumferential edge portion of the second annular bottom surface abutting against the circumferential wall of the inner cylinder, and the second communication hole allowing communication between the second combustion chamber and the plenum chamber.

A second aspect of the present invention (hereinafter referred to as a "second aspect") provides a gas generator including:

a housing having a top plate, a bottom plate and a circumferential wall provided with a gas discharge port, a first combustion chamber disposed on the side of the top plate, a second combustion chamber disposed on the side of the bottom plate, and a plenum chamber facing the gas discharge port and disposed between the first combustion chamber and the second combustion chamber, a first igniter for igniting and burning a first gas generating agent accommodated in the first combustion chamber, and a second igniter for igniting and burning a second gas generating agent accommodated in the second combustion chamber, the first igniter and the second igniter mounted to the bottom plate;

the first igniter disposed to communicate with the first combustion chamber via an inner cylinder with a flame-transferring hole formed at a position facing the first combustion chamber, the inner cylinder disposed such that a first end opening thereof surrounds the first igniter and a second end opening thereof is positioned on the side of the top plate;

the second igniter disposed to face the second combustion chamber;

a first annular retainer having a first annular bottom surface provided with a first communication hole and a first annular outer wall which extends from a first outer circumferential edge portion of the first annular bottom surface toward the top plate, the first annular retainer fitted onto the inner cylinder such that a first inner circumferential edge portion of the first annular bottom surface abuts against a circumferential wall of the inner cylinder, and an annular end surface in an axial direction of the first annular outer wall abuts against the top plate in a state that the first annular outer wall is spaced from the circumferential wall of the housing;

a second annular retainer having a second annular bottom surface provided with a second communication hole and a second annular outer wall which extends from a second outer circumferential edge portion of the second annular bottom surface toward the top plate, the second annular retainer fitted onto the inner cylinder such that a second inner circumferential edge portion of the second annular bottom surface abuts against the circumferential wall of the inner cylinder, and the second annular outer wall abuts against the circumferential wall of the housing;

the first combustion chamber being a space surrounded by the inner cylinder, the first annular retainer and the top plate;

the plenum chamber being a space surrounded by the inner cylinder, the first annular retainer, the circumferential wall of the housing provided with the gas discharge port and the second annular retainer; and the second combustion chamber being a space surrounded by the inner cylinder, the second annular retainer, the circumferential wall of the housing and the bottom plate of the housing.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

In the gas generator in U.S. Pat. No. 6,485,051 B, a cushioning member 25 is arranged on the partition member 5, and the cushioning member 25 performs absorption of a shock and thermal insulation to the gas generating agents 6. However, in the case where the gas generating agent produces a high combustion heat, the thermal insulation effect is not sufficient. Further, since a filtering member 7 is disposed in each of the upper combustion chamber 3 and the lower combustion chamber 4, a filter amount becomes large, which increases overall mass.

The present invention provides a gas generator having a structure in which heat generated by combustion of a first gas generating agent in a first combustion chamber is less likely to be conducted to a gas generating agent in a second combustion chamber, and independent ignitions of the respective gas generating agents are reliably performed.

In the gas generator of the present invention, between a top plate and a bottom plate of a housing, three separate chambers, that is, the first combustion chamber, a plenum chamber facing a gas discharge port and the second combustion chamber are arranged in this order from the top plate. The first gas generating agent is accommodated in the first combustion chamber, a second gas generating agent is accommodated in the second combustion chamber, but at least a gas generating agent is not charged in the plenum chamber and the plenum chamber is a space where air is present.

In the gas generator of the present invention, it is possible that a first igniter activates first to burn the first gas generating agent in the first combustion chamber first and a second igniter activates with a slight delay to burn the second gas generating agent in the second combustion chamber. Alternatively, it is possible that only the first igniter activates to burn only the first gas generating agent (maintaining a state in which the second gas generating agent is left unburned).

Combustion gas generated in the first combustion chamber enters the plenum chamber from a first communication hole and is then discharged from the gas discharge port, and combustion gas generated in the second combustion chamber enters the plenum chamber from a second communication hole and is then discharged from the gas discharge port. At this point, in the case where the plenum chamber is not present, heat or a residue resulting from the combustion gas generated in the first combustion chamber is conducted to the second combustion chamber via a partition wall (a retainer).

However, in the present invention, even when the temperature in the first combustion chamber becomes high due to the combustion of the first gas generating agent and the temperature of a first annular retainer becomes high, the plenum chamber is present between the first annular retainer and a second annular retainer, and hence an increase in the temperature of the second annular retainer is suppressed by the heat insulation function of air. Further, when the combustion gas in the first combustion chamber enters the plenum chamber from the first communication hole, the combustion gas is promptly discharged from the gas discharge port while the temperature of the combustion gas is reduced to be lower than the temperature thereof in the first combustion chamber, and thereby, the increase in the temperature of the second annular retainer is suppressed. Consequently, the second gas generating agent in the second combustion chamber is prevented from being ignited and burned by the heat generated by ignition and combustion of the first gas generating agent in the first combustion chamber, and the independent ignitions of the respective the gas generating agents in the two combustion chambers are reliably performed.

The housing, an inner cylinder, the first annular retainer and the second annular retainer used in the gas generator of the present invention are formed of stainless steel or iron. A known transfer charge or a gas generating agent functioning as the transfer charge may be accommodated inside the inner cylinder. A flame-transferring hole of the inner cylinder is formed at a position facing the first combustion chamber. When a second end opening of the inner cylinder abuts against the top plate, the flame-transferring hole is formed in a portion of a circumferential wall of the inner cylinder, which faces the first combustion chamber. When the second end opening of the inner cylinder does not abut against the top plate and a gap is formed between the second end opening of the inner cylinder and the top plate, the gap faces the first combustion chamber, and hence the gap functions as the flame-transferring hole.

The gas discharge port of a circumferential wall of the housing is closed from the inner side with a metal seal tape for moisture prevention.

Each of holes of the first annular retainer and the second annular retainer does not need to be formed in a central portion and may be formed at an off-center position, and the hole has a shape and a size such as to be fitted onto the inner cylinder. In the first annular retainer and the second annular retainer, respective inner diameters (diameters of the holes), and respective outer diameters and heights of a first annular outer wall and a second annular outer wall are adjusted so as to be press-fitted onto the inner cylinder and the top plate and the circumferential wall of the housing, and thereby, the both retainers are disposed.

The first annular retainer may have a first annular inner wall extending in the same direction as that of the first annular outer wall from a first inner circumferential edge portion (a circumferential edge portion of the hole). When the first annular retainer has the first annular inner wall, the first annular inner wall abuts against the inner cylinder. The second annular retainer may have a second annular inner wall extending in the same direction as that of the second annular outer wall from a second inner circumferential edge portion (a circumferential edge portion of the hole). When the second annular retainer has the second annular inner wall, the second annular inner wall abuts against the inner cylinder.

Each of the first igniter and the second igniter is an igniter used in a known gas generator, and is mounted to one or two holes formed in the bottom plate of the housing.

In the gas generator of a preferred aspect of the present invention, the housing includes a diffuser shell having the top plate and a first circumferential wall provided with the gas discharge port, and a closure shell having the bottom plate and a second circumferential wall;

an outer surface of the second circumferential wall of the closure shell abuts against and is integrated with an inner surface of the first circumferential wall of the diffuser shell to form an annular stepped surface, the annular stepped surface being formed by an annular end surface of the second circumferential wall of the closure shell and facing the top plate of the diffuser shell;

the first annular retainer has a first flange extending outward in a radial direction from a distal end of the first annular outer wall, and the first flange abuts against the top plate; and the second annular retainer has a second flange extending outward in the radial direction from the second annular outer wall, and the second flange abuts against the annular stepped surface.

In the gas generator of the present aspect, the housing includes a combination of the diffuser shell and the closure shell, and the annular stepped surface formed by the first circumferential wall of the diffuser shell and the second circumferential wall of the closure shell is obtained by fitting the closure shell to the inside of the diffuser shell. The first annular retainer has the first flange at the first annular outer wall, the second annular retainer has the second flange at the second annular outer wall, and the second flange abuts against and is supported by the annular stepped surface.

Further, in the gas generator of a preferred aspect of the present invention, an inner diameter and an outer diameter of the inner cylinder are reduced toward the top plate from the bottom plate.

The inner diameter and the outer diameter of the inner cylinder can be reduced continuously or stepwise. In the case of the inner cylinder having the above-described shape, when the first igniter activates and flame or the like is generated, a rising speed of the flame or the like is increased as it approaches the top plate and a discharging speed of the flame or the like into the first combustion chamber is also increased, and thereby, an ignition ability of the first gas generating agent at a position far from the first igniter is enhanced. Further, when a transfer charge is ignited and burned by the flame generated by the activation of the first igniter and a combustion product (flame, combustion gas, or the like) is generated, the rising speed of the combustion product is increased as it approaches the top plate and the discharge speed of the combustion product into the first combustion chamber is also increased, and hence the ignition ability of the first gas generating agent is increased.

Further, in the gas generator of a preferred aspect of the present invention, an inner diameter and an outer diameter of the inner cylinder are reduced stepwise toward the top plate from the bottom plate; and a hole of the first annular retainer is fitted onto a first annular stepped portion, closest to the top plate, of the inner cylinder so that the first annular retainer is disposed to be blocked from moving toward the bottom plate, and a hole of the second annular retainer is fitted onto a second annular stepped portion, second closest to the top plate, of the inner cylinder so that the second annular retainer is disposed to be blocked from moving toward the bottom plate.

In this manner, since the first annular retainer is fitted onto the first annular stepped portion of the inner cylinder and the second annular retainer is fitted onto the second annular stepped portion of the inner cylinder from the top plate of the housing in this order, each of the first annular retainer and the second annular retainer is supported in the axial direction, and is blocked from moving toward the bottom plate. Further, the advantageous effect of enhancing the ignition ability of the first gas generating agent described above is obtained.

Further, in the gas generator of a preferred aspect of the present invention, the second communication hole of the second annular retainer is closed by a closing member from the plenum chamber; and the first communication hole of the first annular retainer and the second communication hole of the second annular retainer are arranged not to align with each other in the axial direction.

The closing member is preferably a seal tape formed by a combination of a base material such as stainless steel and an adhesive. When positions of the first communication hole and the second communication hole in the axial direction do not align with each other, it is possible that the combustion gas discharged from the first communication hole is prevented from directly impinging on the closing member on the second communication hole.

Further, in the gas generator of a preferred aspect of the present invention, the second communication hole of the second annular retainer is closed by the closing member from the plenum chamber, and is disposed not to align with the second igniter in the axial direction.

The closing member closing the second communication hole is preferably ruptured by a pressure increase inside the second combustion chamber due to combustion gas generated by combustion of the second gas generating agent in the second combustion chamber. When the closing member is ruptured thereby, the pressure inside the second combustion chamber is increased to some extent and an ignition ability of the second gas generating agent is preferably enhanced.

In the present aspect, the second communication hole and the second igniter are arranged not to align with each other in the axial direction, and thereby, flame generated from the second igniter or the like is prevented from directly impinging on the second communication hole to damage or rupture the closing member. Consequently, it is possible to avert opening of the second communication hole at an initial stage of combustion of the second gas generating agent, so that a combustion performance of the second gas generating agent is maintained.

Further, it is preferable that the gas generator of the first aspect further including an annular filter disposed in the plenum chamber, a first annular end surface of the annular filter abutting against a portion of the first annular bottom surface where the first communication hole is not present, and a second annular end surface abutting against a portion of the second annular bottom surface where the second communication hole is not present; and at least a portion across which the first annular bottom surface and the second annular bottom surface directly oppose each other being formed.

In this manner, since the annular filter only partially abuts against the first annular bottom surface and the second annular bottom surface of the retainers and the contact area of the annular filter is small, heat conduction via the annular filter is suppressed. This means that the portion across which the first annular bottom surface and the second annular bottom surface directly oppose each other is formed in the plenum chamber, and that, in this portion, there is neither obstruction to the direct opposing relationship between the two bottom surfaces nor physical connection between the first annular bottom surface and the second annular bottom surface.

Further, it is preferable that the gas generator of the second aspect further including an annular filter disposed in the plenum chamber, the annular filter being disposed such that the first annular end surface on the side of the top plate abuts against a portion of the first annular bottom surface of the first annular retainer where the first communication hole is not present, the second annular end surface on the side of the bottom plate abuts against a portion of the second annular bottom surface of the second annular retainer where the second communication hole is not present, and part of an outer circumferential surface of the filter abutting against the second annular outer wall.

In the gas generator of the present aspect, the annular filter is disposed in the plenum chamber. By disposing the annular filter only in the plenum chamber in this manner, a filter amount is reduced as compared with the filter of the gas generator shown in FIG. 1 of U.S. Pat. No. 6,485,051 B.

Further, in a preferred aspect of the present invention,
the annular filter is disposed such that
the first annular end surface thereof on the side of the top plate has a first annular protrusion, and the second annular end surface thereof on the side of the bottom plate has a second annular protrusion; and
the first annular protrusion abuts against the portion of the first annular bottom surface of the first annular retainer where the first communication hole is not present, the second annular protrusion abuts against a portion of the second annular bottom surface of the second annular retainer where the second communication hole is not present, and part of an outer circumferential surface of the filter abuts against a second annular outer wall.

A single, or two or more annular protrusions can be formed respectively as the first annular protrusion and the second annular protrusion of the annular filter. An example of such an annular protrusion can include a case in which a total of two annular protrusions are formed, each on the side of the inner circumferential edge and on the side of the outer circumferential edge of the annular filter, and a case in which a total of three annular protrusions are formed, one being additionally formed at an intermediate position between the above two annular protrusions. Note that in the case of three annular protrusions, a width of the protrusions is reduced so that an area of the three protrusions can be almost equal to an area of the two protrusions. An annular groove is formed between the annular protrusions and the groove is not in contact with the first annular retainer and the second annular retainer.

When the temperature in the first combustion chamber increases and the temperature of the first annular retainer also increases, the temperature of the second annular retainer also increases via the annular filter. However, in the present aspect, the contact area between the first and second annular retainers, and the annular filter is reduced, and thereby, the heat conduction from the first annular retainer to the second annular retainer via the annular filter described above is suppressed.

Further, in the gas generator of a preferred aspect of the present invention, a distance between the first annular retainer and the second annular retainer in the axial direction is set such that a distance (w1) of a portion closer to the circumferential wall of the housing is larger and a distance (w2) of a portion closer to the inner cylinder is smaller (w1>w2), the annular filter is disposed in the portion with the distance of w1, and the first communication hole and the second communication hole are formed in the portion with the distance of w2.

In the gas generator of the present aspect, the distance between the first annular retainer and the second annular retainer is set such that the distance (w1) of the portion in which the annular filter is disposed is larger, and the distance (w2) of the portion in which the annular filter is not disposed is smaller. With this, it is possible to increase a volume of each of the first combustion chamber and the second combustion chamber without reducing an amount of the annular filter. Note that the distance (w2) of the portion in which the annular filter is not disposed may be continuously increased toward the circumferential wall of the housing from the inner cylinder.

In the gas generator of the present invention, heat generated by the combustion of the first gas generating agent in the first combustion chamber is less likely to be conducted to the second gas generating agent in the second combustion chamber, and the independent ignitions of the first gas generating agent and the second gas generating agent are reliably performed.

The gas generator of the present invention is usable as the gas generator for an airbag apparatus mounted on an automobile.

Figure 1:
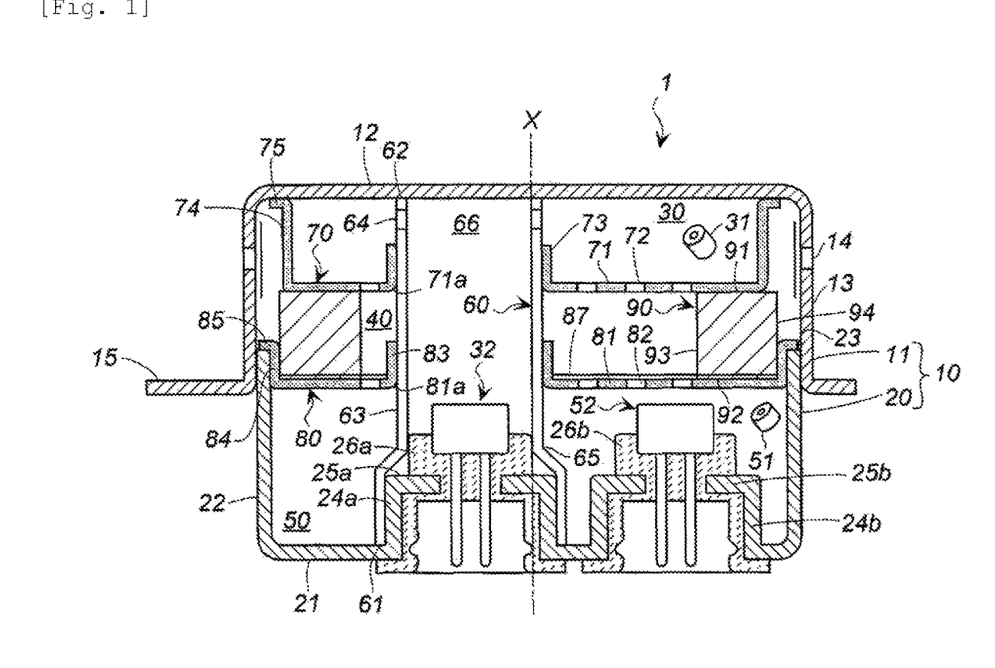
FIG. 1 shows an axial cross-sectional view of one embodiment of a gas generator of the present invention.

Embodiments of the Invention (1) Gas Generator of FIG. 1

A gas generator 1 shown in FIG. 1 includes a housing 10 formed by a diffuser shell 11 which has a top plate 12 and a first circumferential wall 13 provided with a gas discharge port 14, and a closure shell 20 which has a bottom plate 21 and a second circumferential wall 22. The diffuser shell 11 has a flange 15 at a distal end of the first circumferential wall 13. An outer surface of the second circumferential wall 22 of the closure shell 20 abuts against an inner surface of the first circumferential wall 13 of the diffuser shell 11, and is integrated with the inner surface of the diffuser shell 11 at an abutment portion by welding. An annular end surface 23 of the second circumferential wall 22 of the closure shell 20 forms an annular stepped surface continuing from the first circumferential wall 13, in the state of facing a top plate 12.

A first combustion chamber 30 defined on the side of the top plate 12, a second combustion chamber 50 defined on the side of the bottom plate 21, and a plenum chamber 40 defined between the first combustion chamber 30 and the second combustion chamber 50 to face the gas discharge port 14 are arranged inside the housing 10.

A first igniter 32 for igniting and burning a first gas generating agent 31 accommodated in the first combustion chamber 30 and a second igniter 52 for igniting and burning a second gas generating agent 51 accommodated in the second combustion chamber 50 are mounted to the bottom plate 21 of the closure shell 20.

The first igniter 32 is fixed via a first resin 26*a* to a first tubular wall 24*a* which protrudes from a hole formed in the bottom plate 21 in an X-axis direction (toward top plate 12) and a first annular wall 25*a* which protrudes from the first tubular wall 24*a* inward in a radial direction. The first tubular wall 24*a* and the first annular wall 25*a* serve as a known metal collar. A component including the metal collar corresponding to the first tubular wall 24*a* and the first annular wall 25*a* may be fixed to the hole instead of using the first tubular wall 24*a* and the first annular wall 25*a*.

The second igniter 52 is fixed via a second resin 26b to a second tubular wall 24b which protrudes from a hole formed in the bottom plate 21 in the X-axis direction (toward the top plate 12), and a second annular wall 25b which protrudes from the second tubular wall 24b inward in the radial direction. The second tubular wall 24b and the second annular wall 25b serve as the known metal collar, and a component including the metal collar corresponding to the second tubular wall 24b and the second annular wall 25b may be fixed to the hole instead of using the second tubular wall 24b and the second annular wall 25b. The second igniter 52 is disposed to face the second combustion chamber 50. The first igniter 32 and the second igniter 52 are disposed eccentrically to the X axis.

An inner cylinder 60 is disposed to surround the first igniter 32. A plurality of flame-transferring holes 64 are formed at equal intervals in a circumferential direction in a circumferential wall 63 on the side of a second end opening (on the side of a second annular end surface 62) of the inner cylinder 60, closer to the top plate 12. The interior of the inner cylinder 60 and the first combustion chamber 30 communicate with each other via the flame-transferring holes 64. The circumferential wall 63 on the side of a first end opening (on the side of a first annular end surface 61) of the inner cylinder 60, closer to the bottom plate 21 has a reduced diameter portion 65, and the reduced diameter portion 65 abuts against the first resin 26a. The inner cylinder 60 has an enlarged diameter portion in which a diameter is enlarged from the reduced diameter portion 65 to the bottom plate 21. The enlarged diameter portion is press-fitted to the first tubular wall 24a in the state of surrounding the first tubular wall 24a, and the reduced diameter portion 65 is press-fitted to the first resin 26a, thereby fixing the inner cylinder 60. The first annular end surface 61 of the inner cylinder 60 abuts against the bottom plate 21, and the second annular end surface 62 abuts against the top plate 12. Note that, when the second annular end surface 62 does not abut against the top plate 12 and a gap is formed between the second annular end surface 62 and the top plate 12, the gap serves as the flame-transferring hole, and hence it is not necessary to form the flame-transferring holes in the circumferential wall 63. An internal space 66 of the inner cylinder 60 is charged with a known transfer charge (not shown).

The first combustion chamber 30, the plenum chamber 40 and the second combustion chamber 50 are partitioned in an axial direction and the radial direction by combining the housing 10, the inner cylinder 60, a first annular retainer 70 and a second annular retainer 80.

The first annular retainer 70 has a first annular bottom surface 71 provided with a plurality of first communication holes 72 penetrating through the first annular bottom surface 71 in a thickness direction, and a first annular inner wall 73 and a first annular outer wall 74 extending in the same direction respectively from a first inner circumferential edge portion and a first outer circumferential edge portion of the first annular bottom surface 71. Further, a distal end of the first annular outer wall 74 has a first flange 75 extending outward in the radial direction (toward the first circumferential wall 13). A hole 71a of the first annular bottom surface 71 is positioned eccentrically to the center (an off-center hole 71a).

Figure 2:
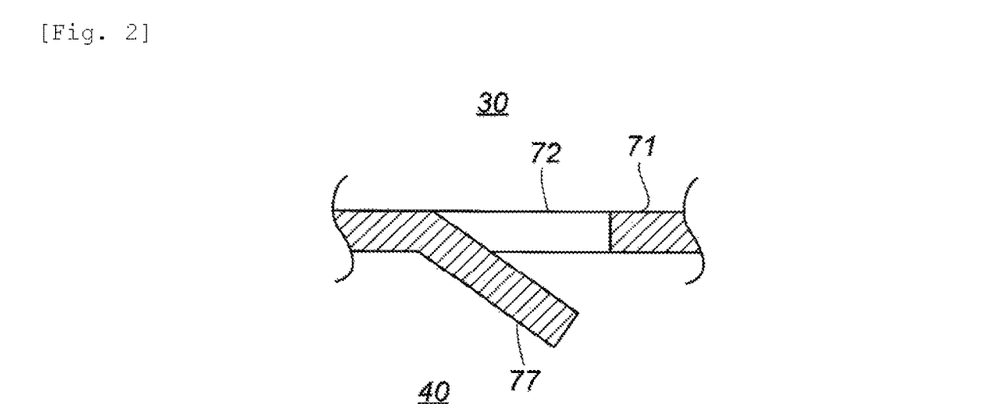
FIG. 2 shows an axial cross-sectional view of an embodiment in which a guide plate is added to a first communication hole of a first annular retainer of the gas generator shown in FIG. 1.

The off-center hole 71a of the first annular retainer 70 is fitted onto the inner cylinder 60. In the first annular retainer 70, the first annular inner wall 73 abuts against the circumferential wall 63 of the inner cylinder 60, and the first flange 75 abuts against the top plate 12 in the state in which the first annular outer wall 74 is spaced from the first circumferential wall 13 (the gas discharge port 14). Guide plates 77 shown in FIG. 2 can be attached to the plurality of first communication holes 72 of the first annular retainer 70 in order to control a flow direction of combustion gas. The guide plate 77 can be formed similarly to a guide plate shown in FIG. 3 of JP-A No. 2010-264773, and has a function of introducing a gas generated in the first combustion chamber 30 outward in a radial direction in the plenum chamber 40.

The second annular retainer 80 has a second annular bottom surface 81 provided with a plurality of second communication holes 82 penetrating through the second annular bottom surface 81 in a thickness direction, and a second annular inner wall 83 and a second annular outer wall 84 extending in the same direction respectively from a second inner circumferential edge portion and a second outer circumferential edge portion of the second annular bottom surface 81. Further, a distal end of the second annular outer wall 84 has a second flange 85 extending outward in the radial direction (toward the first circumferential wall 13). The plurality of second communication holes 82 are closed with a seal tape 87 made of stainless steel applied from the plenum chamber 40. In the embodiment shown in FIG. 1, the seal tape 87 is applied to the entire surface of the second annular retainer 80 in the plenum chamber 40, but the seal tape 87 may be applied only to a portion in which the second communication holes are present. A hole 81a of the second annular bottom surface 81 is positioned eccentrically to the center (an off-center hole 81a).

The off-center hole 81a of the second annular retainer 80 is fitted onto the inner cylinder 60. In the second annular retainer 80, the second annular inner wall 83 abuts against the circumferential wall 63 of the inner cylinder 60, the second annular outer wall 84 abuts against the second circumferential wall 22, and the second flange 85 abuts against the annular end surface 23.

An annular filter 90 for filtering and cooling the combustion gas is disposed in the plenum chamber 40 at a position closer to the first circumferential wall 13. In the annular filter 90, a first annular end surface 91 on the side of the top plate 12 abuts against a portion of the first annular bottom surface 71 of the first annular retainer 70 where the first communication holes 72 are not present, and a second annular end surface 92 on the side of the bottom plate 21 abuts against a portion of the second annular bottom surface 81 of the second annular retainer 80 where the second communication holes 82 are not present. The annular filter 90 is abutted by only parts of the first annular end surface 91 and the second annular end surface 92, and its contact areas with the retainers are small, and hence heat conduction from the first annular end surface 91 to the second annular end surface 92 via the annular filter 90 is suppressed. In other words, a portion across which these annular end surfaces directly oppose each other is formed between the first annular end surface 91 and the second annular end surface 92. Nothing is disposed in the portion across which the first annular end surface 91 and the second annular end surface 92 directly oppose each other (between the two annular end surfaces).

A space is formed between an inter circumferential surface 93 of the annular filter 90 and the circumferential wall 63 of the inner cylinder 60, and part of an outer circumferential surface 94 abuts against the second annular outer wall 84 of the second annular retainer 80. A space is formed between the outer circumferential surface 94 of the annular filter 90 and the first circumferential portion 13.

The first combustion chamber 30 is a space surrounded by the inner cylinder 60, the first annular retainer 70, and the top plate 12. The plenum chamber 40 is a space surrounded by the inner cylinder 60, the first annular retainer 70, the first circumferential wall 13 provided with the gas discharge port 14, and the second annular retainer 80. The second combustion chamber 50 is a space surrounded by the inner cylinder 60, the second annular retainer 80, the second circumferential wall 22 and the bottom plate 21. The first combustion chamber 30 and the plenum chamber 40 communicate with each other via the first communication holes 72, the second combustion chamber 50 and the plenum chamber 40 communicate with each other via the second communication holes 82, and the plenum chamber 40 faces the gas discharge port 14.

Next, an operation of the gas generator 1 shown in FIG. 1, when used in an airbag apparatus for an automobile will be described. Hereinbelow, the case where the first igniter 32 activates first and the second igniter 52 activates with a slight delay will be described.

When a collision accident of an automobile occurs, the first igniter 32 activates promptly, and ignites and burns a transfer charge charged in the internal space 66 of the inner cylinder 60 to generate a combustion product including flame and combustion gas. The combustion product enters the first combustion chamber 30 from the flame-transferring holes 64, and ignites and burns the first gas generating agent 31 to generate combustion gas. The combustion gas generated in the first combustion chamber 30 enters the plenum chamber 40 from the first communication holes 72, is cooled and filtered while passing through the annular filter 90, ruptures a seal tape closing the gas discharge port 14, is discharged to the outside of the housing 10, and inflates an airbag.

The second igniter 52 activates slightly after the activation of the first igniter 32, and ignites and burns the second gas generating agent 51 in the second combustion chamber 50 to generate combustion gas. The combustion gas generated in the second combustion chamber 50 ruptures the seal tape 87, enters the plenum chamber 40 from the second communication holes 82, is cooled and filtered while passing through the annular filter 90, is then discharged from the opened gas discharge port 14, and further inflates the airbag.

In such an operation process, even when a temperature inside the first combustion chamber 30 becomes high due to the combustion of the first gas generating agent 31, and a temperature of the first annular retainer 70 also becomes high, the plenum chamber 40 is present between the first annular retainer 70 and the second annular retainer 80, and thereby, an increase in the temperature of the second annular retainer 80 is suppressed by a heat insulation function of air. Further, when the combustion gas in the first combustion chamber 30 enters the plenum chamber 40 from the first communication holes 72, the seal tape 87 applied from the plenum chamber 40 is not ruptured, and the combustion gas moves to the annular filter 90 in the plenum chamber 40. At this point, the combustion gas passes through the annular filter 90 and is discharged from the gas discharge port 14 from the first combustion chamber 30, while the temperature of the combustion gas is reduced, and hence an increase in the temperature of the second annular retainer 80 is suppressed. As a result, the second gas generating agent 51 in the second combustion chamber 50 is prevented from being ignited and burned by the heat generated by the ignition and combustion of the first gas generating agent 31 in the first combustion chamber 30, and independent ignitions of the first igniter 32 and the second igniter 52 are reliably performed. Further, by forcibly directing the combustion gas to the filter 90 with the use of the guide plate 77 shown in FIG. 2, it is possible to avoid an influence on the seal tape 87 exerted by the pressure or temperature of the gas.

Figure 3:
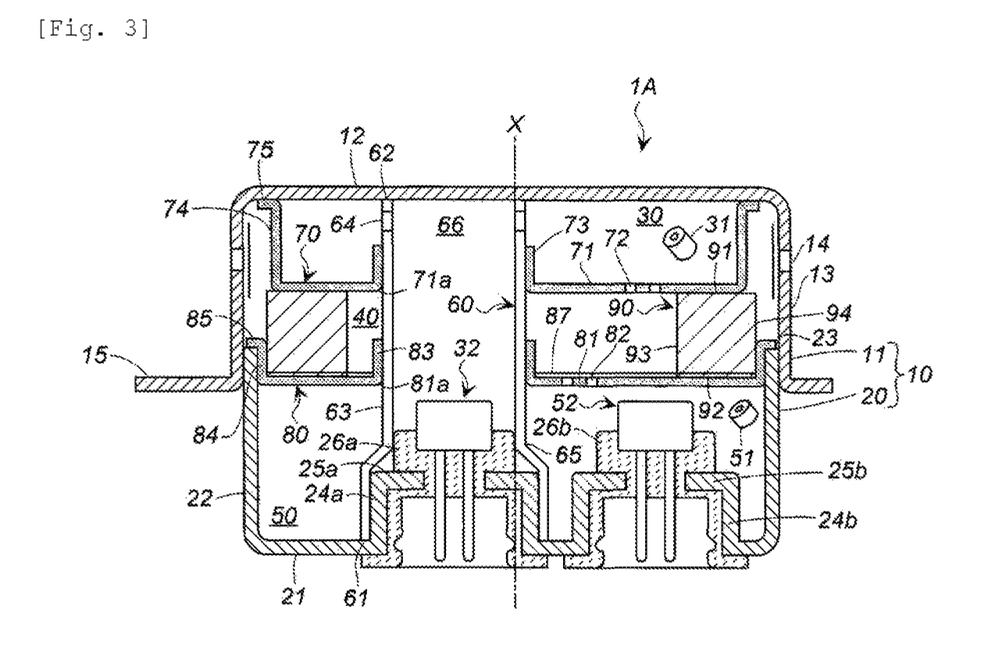
FIG. 3 shows an axial cross-sectional view of an embodiment in which an arrangement state of first communication holes of the first annular retainer and second communication holes of a second annular retainer is different from that in the gas generator shown in FIG. 1.

(2) Gas Generator of FIG. 3

A gas generator 1A shown in FIG. 3 is identical to the gas generator 1 shown in FIG. 1 except that radial positions of the first communication holes 72 of the first annular retainer 70 and the second communication holes 82 of the second annular retainer 80 are different from those in the gas generator 1 in FIG. 1.

The first communication holes 72 of the first annular retainer 70 and the second communication holes 82 of the second annular retainer 80 are formed so as not to align with each other in the X-axis direction. The second communication holes 82 of the second annular retainer 80 are closed by the closing member (the seal tape) 87 from the plenum chamber 40, and are arranged so as not to align with the second igniter 52 in the axial direction.

In the gas generator 1A shown in FIG. 3, when the combustion gas in the first combustion chamber 30 enters the plenum chamber 40 from the first communication holes 72, the combustion gas changes its direction after impinging on a portion of the second annular bottom surface 81 of the second annular retainer 80 in which the second communication holes 82 are not present, and is cooled and filtered while passing through the annular filter 90. Thereafter, the combustion gas is discharged from the gas discharge port 14 and inflates the airbag. The second communication holes 82 are preferably formed radially inward with respect to the first communication holes 72.

As described above, the seal tape 87 applied from the plenum chamber 40 is not ruptured at this point. The combustion gas ejected from the first communication holes 72 is prevented from directly impinging on the seal tape 87 covering the second communication holes 82, and thereby a strength of the seal tape 87 is prevented from being deteriorated before the second igniter 52 activates.

Flame generated by activation of the second igniter 52 impinges on a portion of the second annular bottom surface 81 of the second annular retainer 80 in which the second communication holes 82 are not present, is then diffused, and ignites and burns the second gas generating agent 51 in the second combustion chamber 50. When a pressure in the second combustion chamber 50 is increased sufficiently by the ignition and the combustion of the second gas generating agent 51 (i.e., when the pressure in the second combustion chamber 50 is increased as designed), the seal tape 87 is ruptured and the second communication holes 82 are opened, and hence the combustion of the second gas generating agent 51 is stabilized. That is, the seal tape 87 is not ruptured by the combustion product from the second igniter 52. At this point, if the seal tape 87 is influenced easily by the combustion gas flowing into the plenum chamber 40 from the first combustion chamber 30 or the activation of the second igniter 52, the seal tape 87 can be ruptured before the pressure in the second combustion chamber 50 is increased as designed, so that the combustion of the entire second gas generating agent 51 is impeded. However, in the present embodiment, the seal tape 87 is ruptured after the pressure in the second combustion chamber 50 is increased as designed. Note that, in the case of the gas generator 1 in FIG. 1, the formation positions of the first communication holes 72 and the second communication holes 82 of the second annular retainer 80 align with each other in the X-axis direction. In such a case, a strength of the seal tape 87 is increased by increasing a thickness of a base material thereof, so that the strength of the seal tape 87 is prevented from being deteriorated by the combustion gas flowing from the first combustion chamber 30 into the plenum chamber 40. In this instance, designed internal pressures required to rupture the seal tape 87 in association with the combustion of the second gas generating agent 51 while the strength of the seal tape 87 is enhanced needs to satisfy a relationship of (the maximum internal pressure generated in the first combustion chamber 30)<(the maximum internal pressure generated in the second combustion chamber 50).

Figure 4:
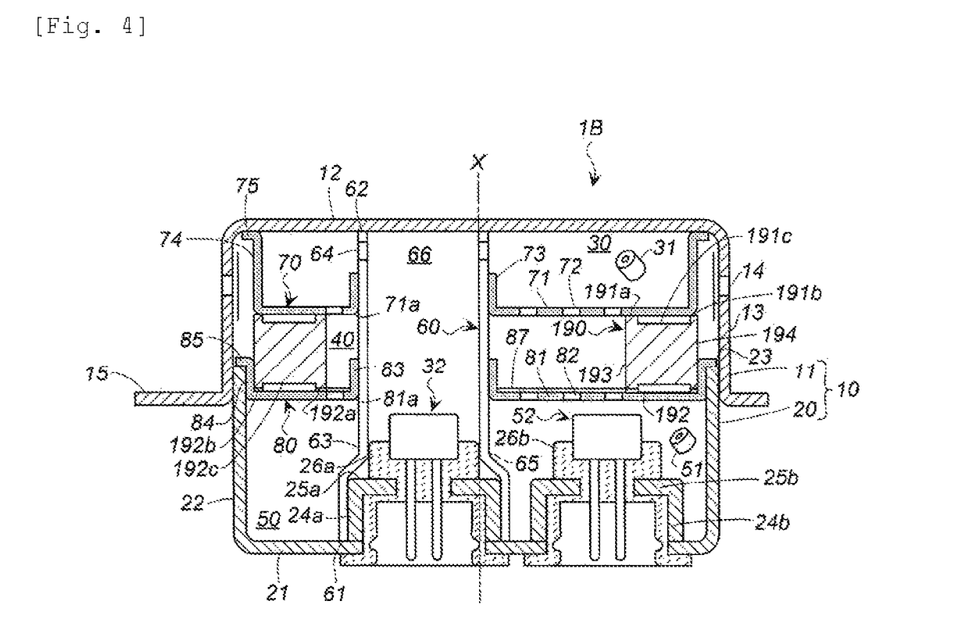
FIG. 4 shows an axial cross-sectional view of an embodiment in which an annular filter different from that used in the gas generator shown in FIG. 1 is used.

(3) Gas Generator of FIG. 4

A gas generator 1B shown in FIG. 4 is identical to the gas generator 1 shown in FIG. 1 except that a shape of the annular filter is different from that in the gas generator 1 in FIG. 1 and an arrangement of the first annular retainer, the second annular retainer and the annular filter is different from that in the gas generator 1 in FIG. 1. Also in the gas generator 1B shown in FIG. 4, similarly to the gas generator 1A shown in FIG. 3, the first communication holes 72 and the second communication holes 82 can be arranged not to align with each other in the X-axis direction.

In an annular filter 190, a first annular end surface on the side of the top plate 12 has a first annular inner protrusion 191a on the side of an inner circumferential surface 193 and a first annular outer protrusion 191b on the side of an outer circumferential surface 194, and a first annular depression 191c is formed between the first annular inner protrusion 191a and the first annular outer protrusion 191b. Further, in the annular filter 190, a second annular end surface 192 on the side of the bottom plate 21 has a second annular inner protrusion 192a on the side of the inner circumferential surface 193 and a second annular outer protrusion 192b on the side of the outer circumferential surface 194, and a second annular depression 192c is formed between the second annular inner protrusion 192a and the second annular outer protrusion 192b.

In the first annular end surface 191 of the annular filter 190, the first annular inner protrusion 191a and the first annular outer protrusion 191b abut against a portion of the first annular bottom surface 71 of the first annular retainer 70 in which the first communication holes 72 are not present. A gap is formed between the first annular depression 191c and the first annular bottom surface 71. In the second annular end surface 192 of the annular filter 190, the second annular inner protrusion 192a and the second annular outer protrusion 192b abut against a portion of the second annular bottom surface 81 of the second annular retainer 80 in which the second communication holes 82 are not present. A gap is formed between the second annular depression 192c and the second annular bottom surface 81. Thus, in the gas generator 1B shown in FIG. 4, contact areas between the annular filter 190 and the respective first and second annular retainers 70 and 80 are smaller than those in the gas generator 1 shown in FIG. 1 and the gas generator 1A shown in FIG. 3.

When the temperature in the first combustion chamber 30 increases and the temperature of the first annular retainer 70 also increases, the temperature of the second annular retainer 80 also increases via the annular filter 190 in contact with the first annular bottom surface 71. However, as in the present embodiment, by reducing the contact areas between the annular filter 190 and the respective first and second annular retainers 70 and 80, a heat conduction from the first annular retainer 70 to the second annular retainer 80 via the annular filter 190 described above is suppressed. Consequently, the present embodiment is more preferable to keep independent ignitions of the first gas generating agent 31 and the second gas generating agent 51.

Figure 5:
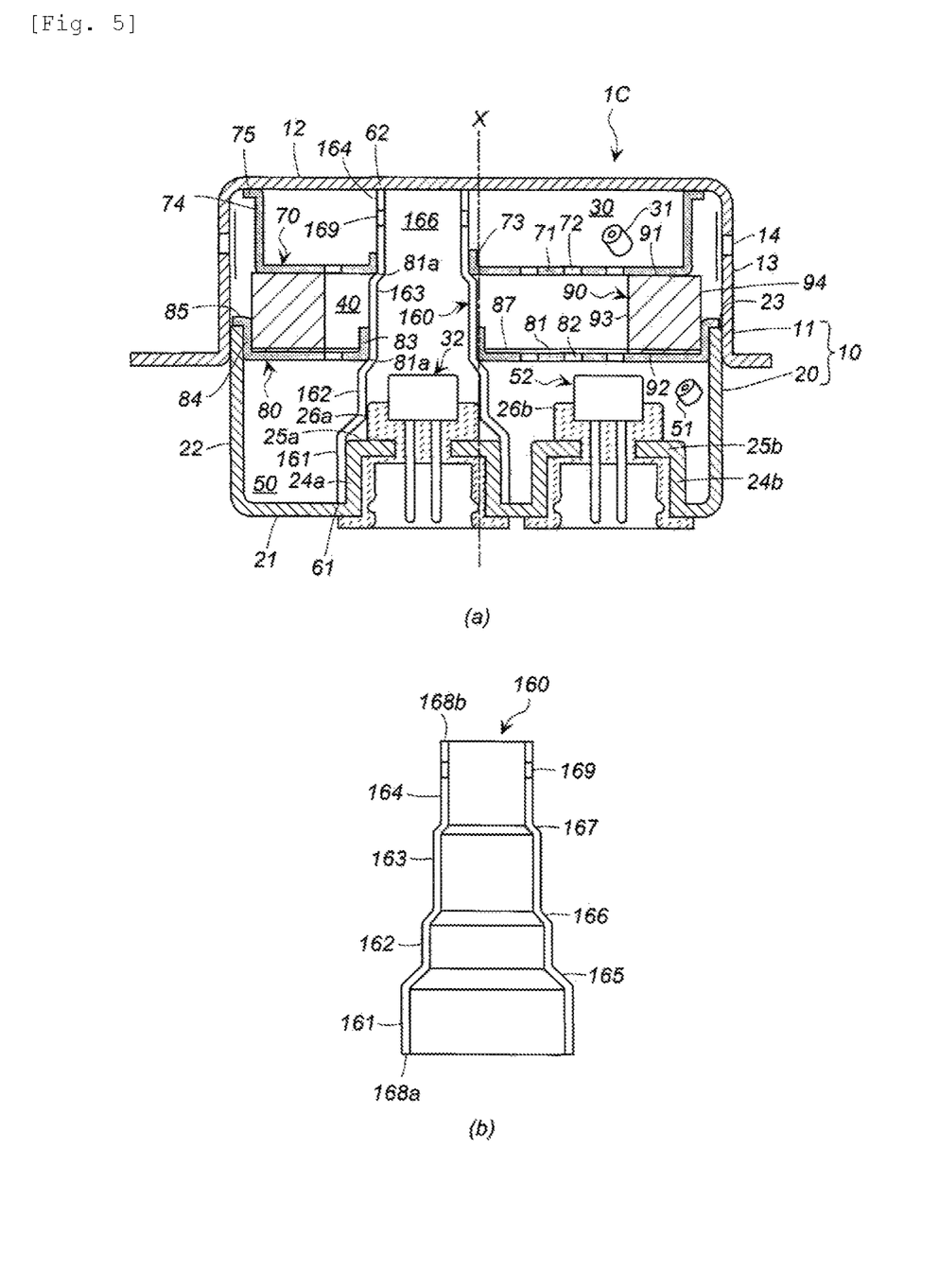
FIG. 5 shows, in (a), an axial cross-sectional view of another embodiment of the gas generator of the present invention, and, in (b), an axial cross-sectional view of an inner cylinder in (a)

(4) Gas Generator of FIG. 5

A gas generator 1C shown in (a) in FIG. 5 is identical to the gas generator 1 shown in FIG. 1 except that a shape of the inner cylinder is different from that in the gas generator 1 in FIG. 1, and an arrangement of the first annular retainer, the second annular retainer and the inner cylinder is different from that in the gas generator 1 in FIG. 1. Also in the gas generator 1C shown in (a) in FIG. 5, similarly to the gas generator 1A in FIG. 3, the first communication holes 72 and the second communication holes 82 can be arranged not to align with each other in the X-axis direction, and the annular filter 190 shown in FIG. 4 can be used.

In the gas generator 1C shown in (a) in FIG. 5, the inner diameter and the outer diameter of an inner cylinder 160 are reduced stepwise from a first annular end surface 168a on the side of the bottom plate 21 toward a second annular end surface 168b on the side of the top plate 12. As shown in (b) in FIG. 5, the inner cylinder 160 has a first tubular portion 161 with the largest inner diameter and the largest outer diameter, a second tubular portion 162 with the second largest inner diameter and the second largest outer diameter, a third tubular portion 163 with the third largest inner diameter and the third largest outer diameter, and a fourth tubular portion 164 with the smallest inner diameter and the smallest outer diameter in this order from the bottom plate 21 to the top plate 12. The inner cylinder 160 has a third annular inclined surface 165 between the first tubular portion 161 and the second tubular portion 162, has a second annular inclined surface 166 between the second tubular portion 162 and the third tubular portion 163, and has a first annular inclined surface 167 between the third tubular portion 163 and the fourth tubular portion 164. The fourth tubular portion 164 has a plurality of flame-transferring holes 169 formed at equal intervals in the circumferential direction.

In the inner cylinder 160, the first tubular portion 161 is press-fitted to the first tubular wall 24a and the second tubular portion 162 is press-fitted to the first resin 26a, and thereby fixing the inner cylinder 160. The first annular end surface 168a abuts against the bottom plate 21, and the second annular end surface 168b abuts against the top plate 12. In the second retainer 80, the second annular inner wall 83 abuts against the third tubular portion 163, and a boundary portion between the second annular bottom surface 81 and the second annular inner wall 83 abuts against the second annular inclined surface (a second annular stepped portion) 166, and thereby the second annular retainer 80 is prevented from moving toward the bottom plate 21. In the first annular retainer 70, the first annular inner wall 73 abuts against the fourth tubular portion 164, and a boundary portion between the first annular bottom surface 71 and the first annular inner wall 73 abuts against the first annular inclined surface (a first annular stepped portion) 167, and thereby the first annular retainer 70 is prevented from moving toward the bottom plate 21.

As shown in (a) and (b) in FIG. 5, the first annular retainer 70 and the second annular retainer 80 are fitted onto the inner cylinder 160 whose inner diameter and outer diameter are changed stepwise, and thereby the both retainers are supported in the axial direction. Further, when the transfer charge is ignited and burned by flame generated by the activation of the first igniter 32 and the combustion product is generated, a rising speed of the combustion product is increased as the combustion product approaches the top plate 12 and a discharge speed of the combustion product discharged into the first combustion chamber 30 from the flame-transferring holes 169 is also increased, and thereby, an ignition ability of the first gas generating agent 31 is enhanced.

Figure 6:
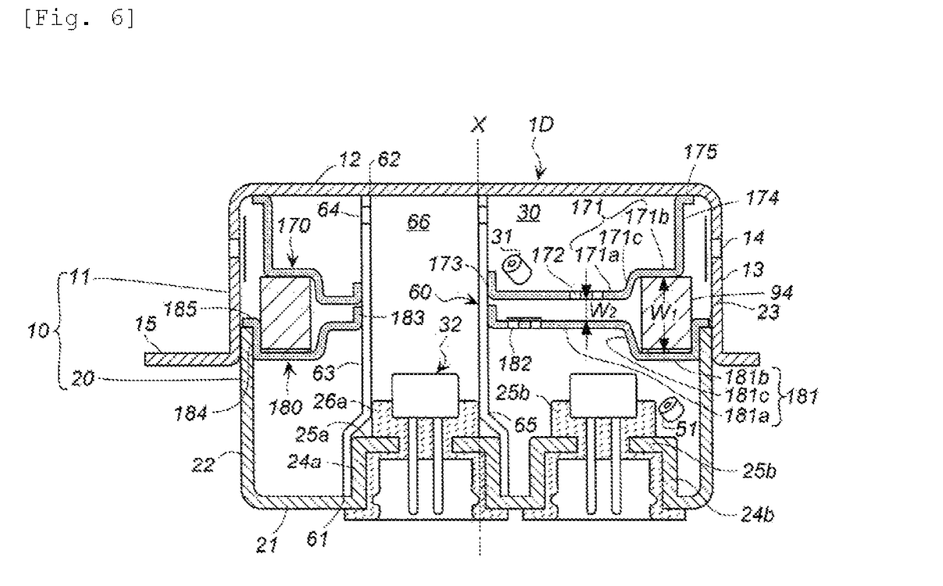
FIG. 6 shows an axial cross-sectional view of yet another embodiment of the gas generator of the present invention.

(5) Gas Generator of FIG. 6

A gas generator 1D shown in FIG. 6 is identical to the gas generator 1 shown in FIG. 1 except that shapes of the first annular retainer and the second annular retainer are different from those in the gas generator 1 in FIG. 1. Also in the gas generator 1D in FIG. 6, the annular filter 190 shown in FIG. 4 can be used, and further the inner cylinder 160 in the gas generator 1C shown in (a) and (b) in FIG. 5 can be used.

A first annular retainer 170 has a first annular bottom surface 171 provided with a plurality of first communication holes 172 penetrating through the first annular bottom surface 171 in a thickness direction, and a first annular inner wall 173 and a first annular outer wall 174 extending in the same direction respectively from a first inner circumferential edge portion and a first outer circumferential edge portion of the first annular bottom surface 171. Further, a distal end of the first annular outer wall 174 has a first flange 175 extending outward (toward first circumferential wall 13) therefrom in the radial direction. The first annular bottom surface 171 includes a first annular inner bottom surface 171a provided with the first communication holes 172 on the side of the inner cylinder 60, and a first annular outer bottom surface 171b on the side of the first circumferential wall 13. A first annular stepped surface 171c inclined toward the top plate 12 from the first annular inner bottom surface 171a to the first annular outer bottom surface 171b is formed between the first annular inner bottom surface 171a and the first annular outer bottom surface 171b.

A second annular retainer 180 has a second annular bottom surface 181 provided with a plurality of second communication holes 182 penetrating through the second annular bottom surface 181 in a thickness direction, and a second annular inner wall 183 and a second annular outer wall 184 extending in the same direction respectively from a second inner circumferential edge portion and a second outer circumferential edge portion of the second annular bottom surface 181. Further, a distal end of the second annular outer wall 184 has a second flange 185 extending outward therefrom in the radial direction (toward the first circumferential wall 13). The second annular bottom surface 181 includes a second annular inner bottom surface 181a provided with the second communication holes 182 on the side of the inner cylinder 60, and a second annular outer bottom surface 181b on the side of the first circumferential wall 13. A second annular stepped surface 181c inclined toward the bottom plate 21 from the second annular inner bottom surface 181a to the second annular outer bottom surface 181b is formed between the second annular inner bottom surface 181a and the second annular outer bottom surface 181b.

Similarly to the gas generator 1A shown in FIG. 3, the first communication holes 172 and the second communication holes 182 do not align with each other in the X-axis direction, but may align with each other in the X-axis direction.

In the first annular retainer 170 and the second annular retainer 180, the first annular inner bottom surface 171a and the second annular inner bottom surface 181a oppose each other in the X-axis direction, the first annular outer bottom surface 171b and the second annular outer bottom surface 181b oppose each other in the X-axis direction, and the first annular stepped surface 171c and the second annular stepped surface 181c oppose each other in the X-axis direction. Consequently, a distance (w1) between the first annular outer bottom surface 171b and the second annular outer bottom surface 181b is larger than a distance (w2) between the first annular inner bottom surface 171a and the second annular inner bottom surface 181a (w1>w2). The annular filter 90 is disposed in a portion with the distance (w1) between the first annular outer bottom surface 171b and the second annular outer bottom surface 181b.

In the embodiment shown in FIG. 6, a volume of each of the first combustion chamber 30 and the second combustion chamber 50 is increased without changing a size of the annular filter 90, and hence it is possible to increase an amount of generated gas by increasing a charged amount of each of the first gas generating agent 31 and the second gas generating agent 51.

Figure 7:
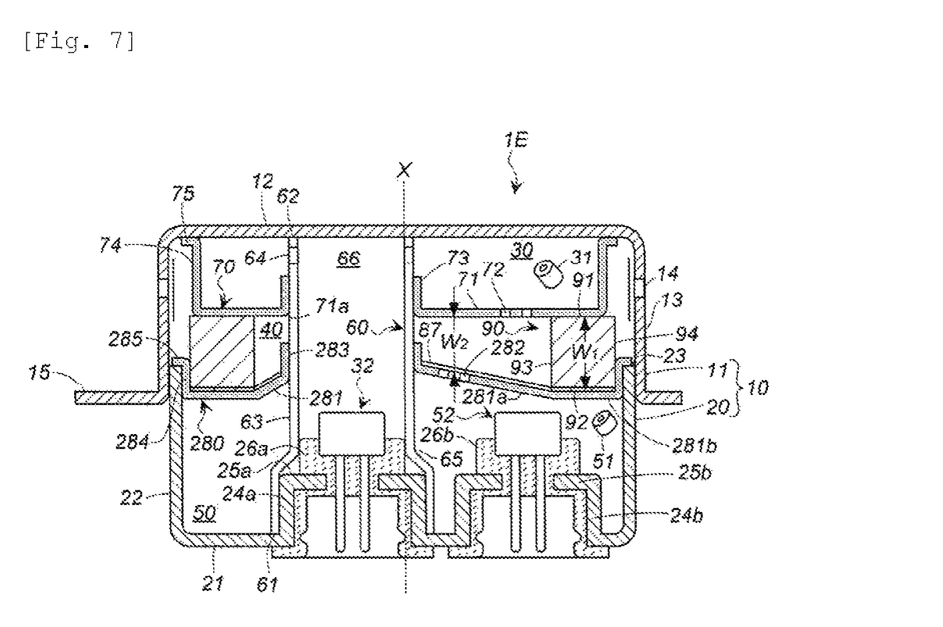
FIG. 7 shows an axial cross-sectional view of an embodiment in which shapes of the first annular retainer and the second annular retainer are different from those in the gas generator shown in FIG. 6.

(6) Gas Generator Shown in FIG. 7

A gas generator 1E shown in FIG. 7 is identical to the gas generator 1 shown in FIG. 1 except that a shape of the second annular retainer is different from that in the gas generator 1 in FIG. 1. Also in the gas generator 1E in FIG. 7, the annular filter 190 shown in FIG. 4 can be used and further, the inner cylinder 160 shown in the gas generator 1C shown in (a) and (b) in FIG. 5 can be used.

The first annular retainer 70 is identical to the first annular retainer 70 used in the gas generator 1 in FIG. 1. A second annular retainer 280 has a second annular bottom surface 281 provided with a plurality of second communication holes 282 penetrating through the second annular bottom surface 281 in a thickness direction, and a second annular inner wall 283 and a second annular outer wall 284 extending in the same direction respectively from a second inner circumferential edge portion and a second outer circumferential edge portion of the second annular bottom surface 281. Further, a distal end of the second annular outer wall 284 has a second flange 285 extending outward therefrom in the radial direction (toward the first circumferential wall 13). The first communication holes 72 and the second communication holes 282 do not align with each other in the X-axis direction when viewed from the first communication holes 72.

The second annular bottom surface 281 includes a second annular inclined surface 281a provided with the second communication holes 282 on the side of the inner cylinder 60, and a second annular flat surface 281b on the side of the first circumferential wall 13. The second annular inclined surface 281a is inclined toward the bottom plate 21 from the second annular inner wall 283 to the second annular flat surface 281b. Consequently, a distance (w1) between the first annular bottom surface 71 and the second annular flat surface 281b is larger than a distance (w2) between the first annular bottom surface 71 and the second annular inclined surface 281a (w1>w2). Note that the distance (w2) between the first annular bottom surface 71 and the second annular inclined surface 281a is continuously increased from the inner cylinder 60 toward the first circumferential wall 13. The annular filter 90 is disposed in a portion with the distance (w1) between the first annular bottom surface 71 and the second annular flat surface 281b.

In the embodiment shown in FIG. 7, a volume of the second combustion chamber 50 is increased without changing a size of the annular filter 90, and hence it is possible to increase an amount of generated gas by increasing a charged amount of the second gas generating agent 51.

Further, since the second annular inclined surface 281a is inclined toward the bottom plate 21 from the second annular inner wall 283 to the second annular flat surface 281b, when the combustion gas in the first combustion chamber 30 enters the plenum chamber 40 from the first communication holes 72 and impinges on the second annular inclined surface 281a, the combustion gas changes its direction to a direction of the annular filter 90 and flows thereto. As a result, the combustion gas becomes less likely to come into contact with the seal tape 87 closing the second communication holes 82. The second annular inclined surface 281a functions similarly to the guide plate 77 shown in FIG. 2.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
 a housing having a top plate, a bottom plate and a circumferential wall provided with a gas discharge port;
 a first combustion chamber formed between a first annular retainer disposed in the housing and the top plate;
 a second combustion chamber formed between a second annular retainer disposed in the housing and the bottom plate;
 a plenum chamber disposed between the first combustion chamber and the second combustion chamber and communicating with the gas discharge port;
 a first igniter fixed to the bottom plate to ignite and burn a first gas generating agent in the first combustion chamber, and a second igniter disposed facing the second combustion chamber to ignite and burn a second gas generating agent in the second combustion chamber;
 an inner cylinder provided with a flame-transferring hole at a position facing the first combustion chamber and disposed in the housing such that a first end opening thereof surrounds the first igniter and a second end opening thereof is positioned on the side of the top plate;
 the first annular retainer having a first annular bottom surface provided with a first communication hole, a first inner circumferential edge portion of the first annular bottom surface abutting against a circumferential wall of the inner cylinder, and the first communication hole allowing communication between the first combustion chamber and the plenum chamber; and
 the second annular retainer having a second annular bottom surface provided with a second communication hole, a second inner circumferential edge portion of the second annular bottom surface abutting against the circumferential wall of the inner cylinder, and the second communication hole allowing communication between the second combustion chamber and the plenum chamber.

2. The gas generator according to claim 1, wherein the second communication hole of the second annular retainer is closed by a closing member from the plenum chamber; and
 the first communication hole of the first annular retainer and the second communication hole of the second annular retainer are arranged not to align with each other in an axial direction.

3. The gas generator according to claim 1, wherein the second communication hole of the second annular retainer is closed by a closing member from the plenum chamber, and is disposed not to align with the second igniter in an axial direction.

4. The gas generator according to claim 1, further comprising:
 an annular filter disposed in the plenum chamber, a first annular end surface of the annular filter abutting against a portion of the first annular bottom surface where the first communication hole is not present, and a second annular end surface abutting against a portion of the second annular bottom surface where the second communication hole is not present; and
 at least a portion across which the first annular bottom surface and the second annular bottom surface directly oppose each other being formed.

5. The gas generator according to claim 4, wherein the annular filter is disposed such that
 the first annular end surface thereof on the side of the top plate has a first annular protrusion, and the second annular end surface thereof on the side of the bottom plate has a second annular protrusion; and
 the first annular protrusion abuts against the portion of the first annular bottom surface of the first annular retainer where the first communication hole is not present, the second annular protrusion abuts against a portion of the second annular bottom surface of the second annular retainer where the second communication hole is not present, and part of an outer circumferential surface of the filter abuts against a second annular outer wall.

6. The gas generator according to claim 5, wherein a distance between the first annular retainer and the second annular retainer in an axial direction is set such that a distance (w1) of a portion closer to the circumferential wall of the housing is larger and a distance (w2) of a portion closer to the inner cylinder is smaller (w1>w2), the annular filter is disposed in the portion with the distance of w1, and the first communication hole and the second communication hole are formed in the portion with the distance of w2.

7. The gas generator according to claim 4, wherein a distance between the first annular retainer and the second annular retainer in an axial direction is set such that a distance (w1) of a portion closer to the circumferential wall of the housing is larger and a distance (w2) of a portion closer to the inner cylinder is smaller (w1>w2), the annular filter is disposed in the portion with the distance of w1, and the first communication hole and the second communication hole are formed in the portion with the distance of w2.

8. A gas generator, comprising:
 a housing having a top plate, a bottom plate and a circumferential wall provided with a gas discharge port, a first combustion chamber disposed on the side of the top plate, a second combustion chamber disposed on the side of the bottom plate, and a plenum chamber facing the gas discharge port and disposed between the first combustion chamber and the second combustion chamber,
 a first igniter for igniting and burning a first gas generating agent accommodated in the first combustion chamber, and a second igniter for igniting and burning a second gas generating agent accommodated in the second combustion chamber, the first igniter and the second igniter mounted to the bottom plate;
 the first igniter disposed to communicate with the first combustion chamber via an inner cylinder with a flame-transferring hole formed at a position facing the first combustion chamber, the inner cylinder disposed such that a first end opening thereof surrounds the first igniter and a second end opening thereof is positioned on the side of the top plate;
 the second igniter disposed to face the second combustion chamber;

a first annular retainer having a first annular bottom surface provided with a first communication hole and a first annular outer wall which extends from a first outer circumferential edge portion of the first annular bottom surface toward the top plate, the first annular retainer fitted onto the inner cylinder such that a first inner circumferential edge portion of the first annular bottom surface abuts against a circumferential wall of the inner cylinder, and an annular end surface in an axial direction of the first annular outer wall abuts against the top plate in a state that the first annular outer wall is spaced from the circumferential wall of the housing;

a second annular retainer having a second annular bottom surface provided with a second communication hole and a second annular outer wall which extends from a second outer circumferential edge portion of the second annular bottom surface toward the top plate, the second annular retainer fitted onto the inner cylinder such that a second inner circumferential edge portion of the second annular bottom surface abuts against the circumferential wall of the inner cylinder, and the second annular outer wall abuts against the circumferential wall of the housing;

the first combustion chamber being a space surrounded by the inner cylinder, the first annular retainer and the top plate;

the plenum chamber being a space surrounded by the inner cylinder, the first annular retainer, the circumferential wall of the housing provided with the gas discharge port and the second annular retainer; and the second combustion chamber being a space surrounded by the inner cylinder, the second annular retainer, the circumferential wall of the housing and the bottom plate of the housing.

9. The gas generator according to claim 8, wherein the housing includes a diffuser shell having the top plate and a first circumferential wall provided with the gas discharge port, and a closure shell having the bottom plate and a second circumferential wall;

an outer surface of the second circumferential wall of the closure shell abuts against and is integrated with an inner surface of the first circumferential wall of the diffuser shell to form an annular stepped surface, the annular stepped surface being formed by an annular end surface of the second circumferential wall of the closure shell and facing the top plate of the diffuser shell;

the first annular retainer has a first flange extending outward in a radial direction from a distal end of the first annular outer wall, and the first flange abuts against the top plate; and the second annular retainer has a second flange extending outward in the radial direction from the second annular outer wall, and the second flange abuts against the annular stepped surface.

10. The gas generator according to claim 8, wherein an inner diameter and an outer diameter of the inner cylinder are reduced toward the top plate from the bottom plate.

11. The gas generator according to claim 8, wherein an inner diameter and an outer diameter of the inner cylinder are reduced stepwise toward the top plate from the bottom plate; and a hole of the first annular retainer is fitted onto a first annular stepped portion, closest to the top plate, of the inner cylinder so that the first annular retainer is disposed to be blocked from moving toward the bottom plate, and a hole of the second annular retainer is fitted onto a second annular stepped portion, second closest to the top plate, of the inner cylinder so that the second annular retainer is disposed to be blocked from moving toward the bottom plate.

12. The gas generator according to claim 8, wherein the second communication hole of the second annular retainer is closed by a closing member from the plenum chamber; and the first communication hole of the first annular retainer and the second communication hole of the second annular retainer are arranged not to align with each other in the axial direction.

13. The gas generator according to claim 8, wherein the second communication hole of the second annular retainer is closed by a closing member from the plenum chamber, and is disposed not to align with the second igniter in an axial direction.

14. The gas generator according to claim 8, further comprising: an annular filter disposed in the plenum chamber, the annular filter being disposed such that the first annular end surface on the side of the top plate abuts against a portion of the first annular bottom surface of the first annular retainer where the first communication hole is not present, the second annular end surface on the side of the bottom plate abuts against a portion of the second annular bottom surface of the second annular retainer where the second communication hole is not present, and part of an outer circumferential surface of the filter abutting against the second annular outer wall.

15. The gas generator according to claim 14, wherein the annular filter is disposed such that the first annular end surface thereof on the side of the top plate has a first annular protrusion, and the second annular end surface thereof on the side of the bottom plate has a second annular protrusion; and the first annular protrusion abuts against the portion of the first annular bottom surface of the first annular retainer where the first communication hole is not present, the second annular protrusion abuts against a portion of the second annular bottom surface of the second annular retainer where the second communication hole is not present, and part of an outer circumferential surface of the filter abuts against a second annular outer wall.

16. The gas generator according to claim 14, wherein a distance between the first annular retainer and the second annular retainer in the axial direction is set such that a distance (w1) of a portion closer to the circumferential wall of the housing is larger and a distance (w2) of a portion closer to the inner cylinder is smaller (w1>w2), the annular filter is disposed in the portion with the distance of w1, and the first communication hole and the second communication hole are formed in the portion with the distance of w2.

* * * * *